Nov. 3, 1953  T. R. THOREN  2,657,635
FUEL PUMP AND CONTROL SYSTEM
Filed June 25, 1948  2 Sheets-Sheet 1
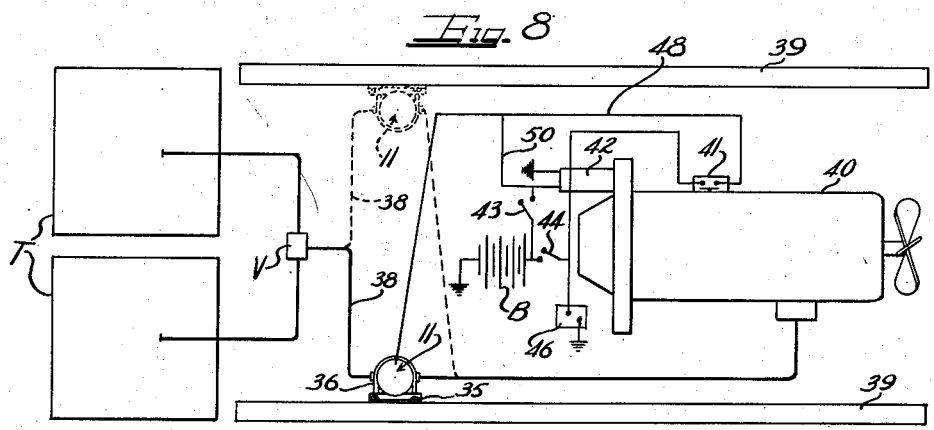
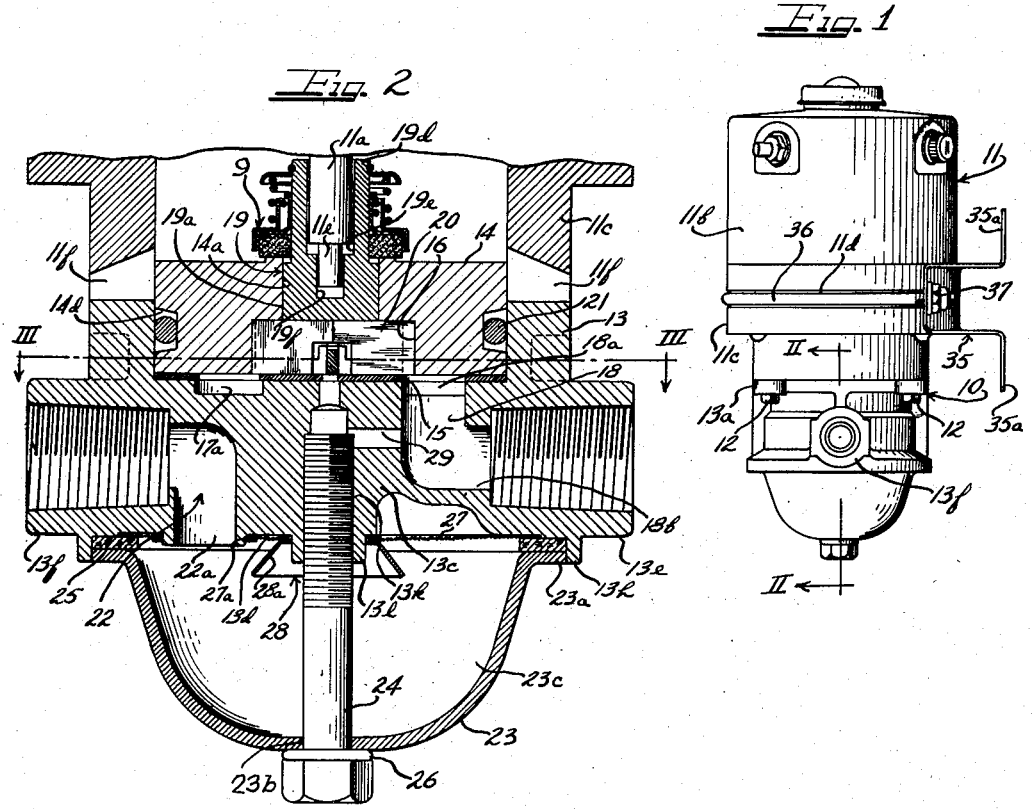
Inventor
THEODORE R. THOREN

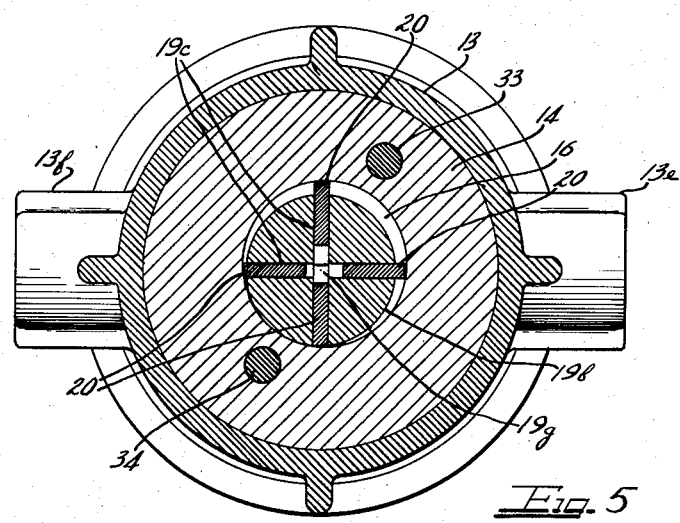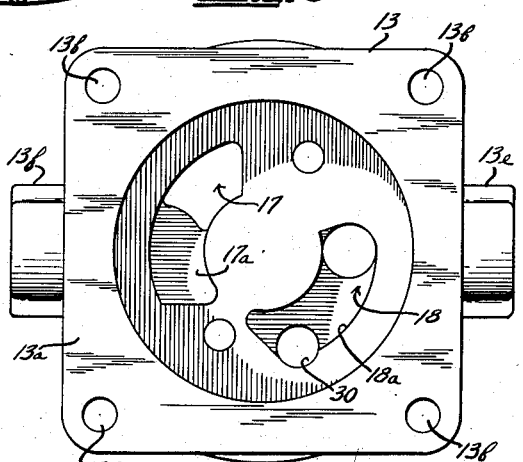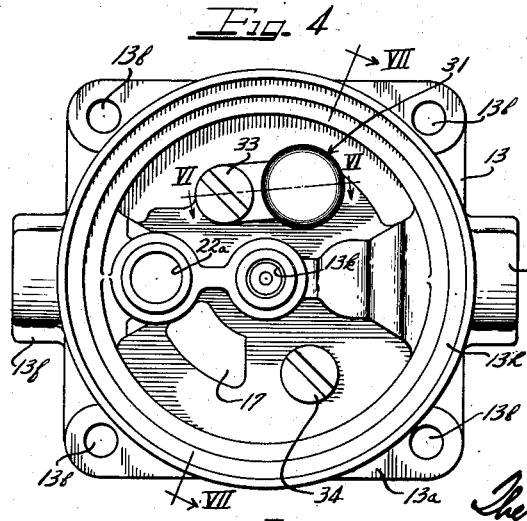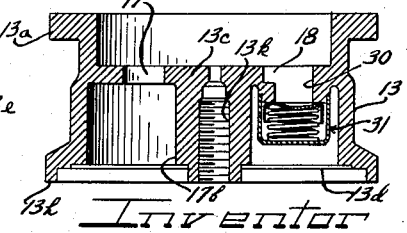

Patented Nov. 3, 1953

2,657,635

UNITED STATES PATENT OFFICE 2,657,635

FUEL PUMP AND CONTROL SYSTEM

Theodore R. Thoren, Chagrin Falls, Ohio, assignor to Thompson Products, Inc., Cleveland, Ohio, a corporation of Ohio Application June 25, 1948, Serial No. 35,253

6 Claims. (Cl. 103—42)

This invention relates to an improved pump particularly adapted for use in the fuel system of an internal combustion engine and to an improved control system for such pump for controlling the operation of the pump in response to certain operating characteristics of an internal combustion engine.

Fuel pumps heretofore employed in the fuel systems of automotive internal combustion engines have generally been mechanically driven by the engine, such as through a suitable connection to the cam or crank shaft of the engine. Such a drive arrangement necessarily required that the pump be mounted as close as possible to the engine, and it necessarily followed that the pump was located a substantial distance from the fuel tank of the particular automotive vehicle and that a substantial length of conduit was required to connect the pump with the fuel tank. As a result, such fuel systems have been peculiarly susceptible to the establishment of vapor locks in the fuel line due to the required pressure drop along the line. Furthermore, an engine mounted pump tends to soak up heat from the engine which further tends to produce vapor lock. For this reason the type of fuel pump heretofore generally employed in automotive vehicles has been the so-called diaphragm type of pump wherein a diaphragm member was reciprocated by a mechanical connection to the cam shaft of the engine. Even the best designs of diaphragm type pumps require a unit of substantial size, and furthermore, such pumps do not have the best suction properties.

It has heretofore been proposed, and the proposal has been widely used in aircraft fuel systems, that the fuel pump be submerged in the fuel tank. While such an arrangement has advantages in eliminating the possibility of vapor locks, it is subject to a serious cost disadvantage as applied to trucks having a plurality of fuel tanks, in that a separate pump must be provided for each fuel tank.

In accordance with this invention, an electrically driven, vane-type pump is employed in the fuel system of an internal combustion engine, and such arrangement finds particular utility in automotive and aircraft fuel engine systems. The pump may then be conveniently located adjacent the fuel tank or at any other convenient point in the fuel line, inasmuch as no mechanical drive connections from the engine are required. Such a pump has dry suction ability and therefore does not need to be submerged within the fuel tank or mounted gravitationally below the tank. Such pump will not soak up heat from the engine. Lastly, only one pump is required regardless of the number of tanks on the vehicle, so long as the various tanks are suitably interconnected by a selector cock.

A feature of this invention is the provision of an improved rotary vane pump particularly adaptable for use in a fuel system of an internal combustion engine. The construction of such pump has been unusually simplified and yet such pump includes not only means for pressuring the fuel but also incorporates a pressure limiting device, a fluid settling chamber, and a filtering screen. Hence in a single pump unit, constructed in accordance with this invention, a multiplicity of necessary functions required for proper operation of an internal combustion engine fuel system are performed.

Furthermore, the electrical control system provided by this invention for control of the energization of the electric motor driving the fuel pump assures the proper operation of the pump during all operating conditions of the internal combustion engine, particularly during the initial starting of the engine, and is so arranged that the fuel pump will not be actuated when the engine stops for any reason.

Accordingly, it is an object of this invention to provide an improved fuel pump for the fuel system of an internal combustion engine and an improved control system for actuating such pump in accordance with the operating condition of the engine.

Another object of this invention is to provide an improved electrically driven, vane type pump for the fuel system of an internal combustion engine which may be mounted at any convenient point in the fuel system between the fuel tank and the engine.

Still another object of this invention is to provide an improved vane type pump for the fuel system of an internal combustion engine wherein the pump construction is so arranged as to unitarily incorporate a settling chamber and a filtering screen for purifying the fuel in the fuel system and, in addition, a pressure regulating device to limit the maximum fuel pressure produced by the pump.

A further object of this invention is to provide a vane type fluid pump characterized by unusual simplicity of construction and ease of manufacture and assemblage, whereby a vane type pump may be produced at a cost permitting price competition with the more commonly used diaphragm type pump.

A particular object of this invention is to provide an improved casing for a vane type pump characterized by the utilization of an end face of the casing, in which both the pump inlet port and a fluid supply passage open, to cooperate with a cup-shaped container element to provide a fluid settling chamber. Furthermore, the improved construction permits a filtering screen to be secured in the path of fluid flow through the settling chamber and such screen requires no separate fastening arrangements, being clamped in position between the cup-shaped container and the casing end face.

The specific nature of this invention as well as other objects and advantages thereof will become apparent to those skilled in the art from the following detailed description of the annexed sheets of drawings, which, by way of preferred example only, illustrate one specific embodiment of the invention.

On the drawings:

Figure 1 is an elevational view of a pump and motor unit embodying this invention;

Figure 2 is an enlarged scale sectional view taken on the plane II—II of Figure 1;

Figure 3 is a sectional view taken on the plane III—III of Figure 2;

Figure 4 is a bottom elevational view of the pump with the settling chamber container removed;

Figure 5 is a top elevational view of the casing member;

Figure 6 is an enlarged scale, sectional view taken on the plane VI—VI of Figure 4;

Figure 7 is a reduced scale, sectional view taken on the plane VII—VII of Figure 4; and Figure 8 is a schematic diagram illustrating a fuel system constructed in accordance with this invention and showing the electrical circuit connections for energizing the fuel pump motor in accordance with the operating conditions of the internal combustion engine.

As shown on the drawings:

While the pump construction embodying this invention finds particular utility in the fuel system of an automotive or aircraft internal combustion engine, those skilled in the art will recognize that such pump is in no manner limited to this specific application but may be employed in any fluid pressuring system.

Referring particularly to Figure 1, the pump unit 10 embodying this invention is preferably rigidly secured to a suitable prime mover, such as an electric motor 11. The motor 11 is of the totally enclosed type, so as to eliminate any possibility of fire hazards when the pump is employed in a fuel system. Motor 11 has an output shaft 11a (Figure 2) which is surrounded by an annular extension flange 11c of the motor casing 11b.

The pump unit 10 comprises a main casing element 13 which is of generally cup-shaped configuration, having a bottom wall 13c of substantial thickness in which a plurality of fluid passages are formed in a manner that will be described. The pump unit 10 is secured to the flange 11c of the motor casing 11b in any convenient manner, such as by a plurality of bolts 12 which pass through suitable holes 13b provided in an integral flange 13a formed on the rim of cup-casing 13.

A generally cylindrical liner block 14 is snugly inserted within the casing 13 and is supported adjacent the top surface of the casing bottom wall 13c, resting upon a washer like thrust plate 15. The liner 14 has a central recess formed therein having an upper concentric portion 14a and a lower portion which is eccentrically located with respect to the axis of the casing 13 and thus provides a pumping chamber 16. Suitable inlet and outlet ports 17 and 18 respectively are formed in the bottom wall 13c of the casing 13 and have arcuate segmental openings 17a and 18a through the top surface of bottom wall 13c and communicate with the pumping chamber 16 through correspondingly shaped apertures formed in the thrust plate 15.

A rotor 19 is provided having an intermediate cylindrical portion 19a rotatably journaled in the small diameter portion 14a of the central aperture in the block 14. A radially slotted end portion 19b of the rotor projects into the pumping chamber 16 but, of course, is eccentrically located with respect to the side walls of such pumping chamber. Angularly spaced radial slots 19c are provided in the rotor end 19b and pumping vanes 20 are respectively mounted in such slots and are radially movable therein so as to maintain the radially outer faces of such vanes in engagement with the walls of pumping chamber 16 as rotor 19 is rotated.

Rotor 19 has a still further reduced diameter shaft portion 19d projecting upwardly out of the liner block 14 and such portion is internally bored, as indicated at 19e to receive the motor shaft 11a therein in co-rotational securement. Preferably, the extreme end of the rotor shaft 11a is of non-circular configuration, as indicated at 11e and the conforming portion 19f of the rotor recess 19e is of similar non-circular configuration so that the rotor 19 will be co-rotatably secured to the motor shaft 11a.

To prevent fluid leakage between the periphery of the liner block 14 and the side walls of the pump casing 13, a sealing ring 21 is provided which may be conveniently mounted in an annular groove 14d provided in the periphery of the block 14. Likewise, to prevent fluid leakage between the rotor 19 and the liner 14, a shaft sealing unit 9 is provided in surrounding relationship to the rotor extension portion 19c. Since this sealing unit may comprise any one of several well known forms, it will not be described in further detail.

While the aforedescribed sealing arrangements are generally adequate to prevent leakage of fluid, in the event that such leakage does occur, the leakage fluid must be drained away from the motor casing 11b so as to preclude the possibility of such fluid obtaining access to the interior of the motor wherein it could possible be ignited by the spark produced at the motor commutator (not shown). Hence, at least a pair of diametrically opposed drain openings 11f are formed in the bottom edge of the flange 11c of the motor casing 11b.

As is best shown in Figure 7, the other end 17b of the inlet port 17 opens in the bottom end face 13d of the pump casing 13. The other end 18b of the outlet port 18 communicates with an internally threaded bore of a protuberance 13e by which the outlet of the pump may be connected in conventional manner to the pressure side of the fuel system. Diametrically opposed from protuberance 13e is a similar internally threaded hollow protuberance 13f by which the pump may be connected to the low pressure side of the fuel system. The bore of protuberance 13f communicates with a fluid supply passage 22 formed in the casing bottom wall 13c and passage 22 also opens in the end face 13d of casing 13 as indicated at 22a.

A container 23 is provided which is of generally cup-shaped configuration, having an outturned rim portion 23a. An annular, depending flange 13h is formed on the bottom casing wall 13d and the rim portion 23a of container 23 fits snugly within such flange to cooperate with the bottom end wall 13d to define a fluid settling chamber. Container 23 is conveniently secured to the casing 13 by a bolt 24 which passes through a suitable aperture 23b in the bottom of container 23 and is threaded into the lower portion of a central aperture 13k formed in the casing 13. The container 23 is maintained in fluid sealed relationship with respect to the casing 13 by an annular seal 25 which is disposed between the container rim 23a and the end wall 13d of the casing 13, and an O-ring seal 26 which is compressed between the head of bolt 24 and the bottom face of container 23.

From the construction thus far described, it is apparent that the container 23 defines a fluid settling chamber 23c which will permit the gravity separation of extraneous fluids, such as water, from the fuel being supplied to the pump through the supply passage 22. Since the inlet port 17 communicates with the fluid settling chamber 23c adjacent the top portions thereof, it is apparent that only the lighter weight fuel will be drawn into the pumping chamber 16 through the inlet port 17, while heavier extraneous fluids, such as water, will be collected in the bottom portions of container 23. If desired, container 23 may be formed of glass or other suitable transparent material to facilitate the inspection of its fluid contents.

In all internal combustion engine fuel systems, it is desirable that the fuel be filtered to remove foreign particles therefrom prior to supplying the fuel to the carburetor of the engine. Such filtering may be conveniently accomplished in a pump embodying this invention by the disposition of a disc-like filtering screen 27 in a position abutting the bottom face 13d of the casing 13. In such position, no special retaining arrangements need be provided for the filter 27, inasmuch as the peripheral portions thereof may be clamped between the container 23 and the casing 13, as is clearly shown in Figure 2. Since it is generally not desirable to impose a filtering screen directly across a relatively restricted fuel passage, the screen is apertured as indicated at 27a so as to surround the fluid supply port opening 22a and permit unimpeded fluid flow into the settling chamber 23. To provide sufficient support for the central portions of the filter screen 27, an annular sheet metal retainer 28 is provided which is crimped around the edges of the screen defining the central opening therein and fits snugly around an annular, depending boss 13l integrally formed on the casing 13. If desired, the retainer 28 may be provided with a flared skirt portion 28a which functions as a fluid baffle to prevent direct flow from fluid mouth 22a of fluid supply passage 22 into the mouth 17b of inlet port 17. Instead, such flared skirt portion directs the incoming fluid into the fluid settling chamber 23 and insures that gravitational separation of extraneous liquid that might be contained in the fuel will be effected.

It has already been mentioned that the casing bottom 13c is provided with a central aperture 13k which is threaded at its lower end to receive the bolt 24. The aperture 13k extends entirely through the bottom wall 13c and communicates with the central fluid chamber 19g formed at the intersection of the vane slots 19c in the rotor 19. The thrust plate 15 is of course suitably apertured to permit such communication. A connecting passage 29 is then formed between the outlet port 18 and the top portion of the aperture 13k. In this manner, a portion of the pressured fluid is applied to the inner faces of the vanes carried by the rotor 19. Hence an outward bias of such vanes is automatically produced by such bleed off from the output side of the pump and the outer ends of the vanes are maintained in snug engagement with the walls of the pumping chamber 16.

Lastly, a by-pass passage 30 is formed in the base portion 13c of the casing 13 providing communication between the outlet port 18 and the fluid settling chamber 23c, as is best shown in Figures 6 and 7. A relief valve unit 31 is mounted on the bottom face 13d so as to normally maintain the by-pass passage 30 closed. Such relief valve may comprise a sheet metal housing 31a of generally cup-shaped configuration but having an integrally formed, projecting mounting ear 31b by which the housing may be secured to the bottom face 13d of the casing 13 by a bolt 33 which passes entirely through the base 13c of the casing 13 and also threadably engages the liner block 14 to retain it in its proper position in the casing 13. An additional bolt 34 may be provided in diametrically opposed relationship to the bolt 33 to further secure the liner block 14 in the casing 13.

Within the valve housing 31a an inverted cup-shaped valve unit 31c is mounted for axial movement and is normally biased into sealing relationship across the by-pass passage 30 by a spring 31d. The maximum pressure developed in the outlet port 18 will then be limited by the by-pass valve unit 31 and the value of such maximum depends upon the pressure exerted by the spring 31d. Upon the attainment of an output pressure of sufficient magnitude to shift the valve 31c from its seat against the biasing force exerted by spring 31d, the output port 18 of the pump will then be bled back to the low pressure or inlet side and hence the output pressure will decrease until the spring 31d can again close the valve 31c. To provide an unimpeded flow path for fluid bleeding back through the by-pass 30 when the valve 31c is opened, the valve housing 31a is provided with a large aperture 31e in its side wall.

From the foregoing description, it is apparent that a pump construction in accordance with this invention is unusually adaptable to fuel systems for internal combustion engines for, in addition to accomplishing the pressuring of the fuel, it also accomplishes the filtering and fluid settling functions and limits the output pressure developed by the pump. Furthermore, the entire construction is of such a simplified nature as to permit the pump to be economically produced by quantity production methods.

The combined motor and pump unit may be mounted in any convenient manner upon a vehicle or aircraft. For example, a mounting bracket 35, having apertured mounting flange portions 35a, may be secured to the combined motor and pump unit by a generally U-shaped ring 36 which engages in a peripheral groove 11d formed in the exterior of the motor casing 11b. The ends of the ring 36 are threaded and project through suitable apertures in mounting bracket 35 and the ring is drawn into clamping engagement with respect to the motor casing 11 by the tightening of nuts 37 upon such threaded end portions.

Since the fuel pump is driven by a prime mover entirely separate from the internal combustion engine to which fuel is to be supplied, the pump may obviously be located at any convenient location on the vehicle or aircraft. Hence, to reduce the possibility of vapor lock, the pump may be conveniently mounted adjacent the fuel tank T of the vehicle, in the manner indicated schematically in Figure 8. In the event that two or more fuel tanks are employed, it will be understood that a suitable selector valve V is provided to selectively connect each of the tanks to a conduit 38 which is in communication with the fluid supply passage 22 of the pump 10. In the particular case of an automotive vehicle, the motor and pump unit may be conveniently mounted on either right or left hand longitudinal frame members 39 of the vehicle chassis, as respectively indicated by the dotted and solid lines.

As is clearly shown in Figure 8, this invention provides a novel control circuit for energizing the pump driving motor 10 in accordance with the operating condition of an internal combustion engine 40. As is customary, the engine 40 embodies a pressured lubricating system and a conventional pressure operated electric switch 41 is provided and mounted on the engine in such manner as to effect the closure of its contacts when a normal range of lubricating pressures is attained in the engine lubricating system. Furthermore, it will be assumed that the engine is provided with an electric starting motor 42 which is energized from the battery B of the vehicle from a manual or foot controlled switch 43. Also, an ignition switch 44 is provided which controls the energization of the ignition system of the engine, indicated schematically at 46. With the aforedescribed elements of a conventional internal combustion engine, the driving motor 11 of the fuel pump 10 is then connected by a conductor 49 in series with the contacts of the pressure operated switch and then connected to the cold terminal of the ignition switch 44. Additionally, the motor 11 is connected by conductor 50 for energization in parallel with the starter motor 42 whenever the starter motor switch 43 is closed.

With the aforedescribed arrangement, it is apparent that the fuel pump 10 cannot be actuated unless the ignition switch 44 is turned to its "on" position. During the starting of the internal combustion engine, the fuel pump is actuated by the energization of its motor 11 in parallel with the starting motor 42. Once the engine has started, the pressure in the lubricating system immediately builds up to a sufficient value to close the contacts of the pressure operated switch 41 and hence, the fuel pump continues to be actuated so long as a proper range of value of pressure is maintained in the lubricating system.

It is therefore apparent that the described control circuit not only insures that fuel will be supplied to the engine under both starting and running conditions, and the supply of fuel will be interrupted upon the stopping of the engine, but furthermore, the control circuit functions as a safety system to immediately stop the engine upon a failure of the pressure in the lubricating system, irrespective of the cause of such failure. Such arrangement, of course, is of substantial value inasmuch as it insures that the engine will not be operated without proper lubrication.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. A pump comprising a casing having a recess with a multi-ported end face, a pump block in said recess having an end face bottomed on said end face of the casing, said end face of the block having a recess therein overlapping the ports in the end face of the casing, a vaned rotor in said recess of the block coacting therewith to define a pumping chamber with an inlet portion joined to one port of the casing and an outlet portion joined to another port of the casing through the overlapping portions of the block recess and the ports, said casing having passages extending from said ports, the passage from the port registering with the outlet side of the pump chamber extending through the side of the casing, the passage extending from the port registering with the inlet side of the pump chamber extending to the bottom of the casing, a settling cup on the bottom of the casing communicating with the last-mentioned passage, a filter between said last-mentioned passage and the cup, and said casing having an inlet passage communicating with the top of the cup.

2. A fluid pump comprising a casing having an end face, a block disposed on said end face, said block having a recess therein cooperating with said end face to define a pumping chamber, said end face having an inlet port and an outlet port therein over which said recess in said block extends, a rotor rotatably journalled in said block, a plurality of vanes disposed on said rotor and movable in said chamber for pumping fluid from said inlet port in said end face of said casing to said outlet port in said end face of said casing, a settling cup detachably secured over an end portion of said casing, said casing having an inlet and an outlet in side portions thereof, said end portion of said casing having a plurality of openings therein, said casing having a supply passage therein extending from said inlet in a side portion thereof to one of said plurality of openings in said end portion thereof, said casing having a second passage therein extending from another of said plurality of openings in the end portion thereof to said inlet port in said end face thereof, and said casing having a third passage therein extending from said outlet port in the end face thereof to said outlet in the side portion thereof.

3. A fluid pump comprising a casing having an end face, a block disposed on said end face, said block having a recess therein cooperating with said end face to define a pumping chamber, said end face having an inlet port and an outlet port therein over which said recess in said block extends, a rotor rotatably journalled in said block, a plurality of vanes disposed on said rotor and movable in said chamber for pumping fluid from said inlet port in said end face of said casing to said outlet port in said end face of said casing, a settling cup detachably secured over an end portion of said casing, said casing having an inlet and an outlet in side portions thereof, said end portion of said casing having a plurality of openings therein, said casing having a supply passage therein extending from said inlet in a side portion thereof to one of said plurality of openings in said end portion thereof, said casing having a second passage therein extending from another of said plurality of openings in said end portion thereof to said inlet port in said end face thereof, a filter screen between said last mentioned opening and said cup, and said casing having a third passage therein extending from said outlet port in the end face thereof to said outlet in the side portion thereof.

4. A fluid pump comprising a casing having an end face, a block disposed on said end face, said block having a recess therein cooperating with said end face to define a pumping chamber, said end face having an inlet port and an outlet port therein over which said recess in said block extends, a rotor rotatably journalled in said block, a plurality of vanes disposed on said rotor and movable in said chamber for pumping fluid from said inlet port in said end face of said casing to said outlet port in said end face of said casing, a settling cup detachably secured over an end portion of said casing, said casing having an inlet and an outlet in side portions thereof, said end portion of said casing having a plurality of openings therein, said casing having a supply passage therein extending from said inlet in a side portion thereof to one of said plurality of openings in said end portion thereof, said casing having a second passage therein extending from another of said plurality of openings in the end portion thereof to said inlet port in said end face thereof, said casing having a third passage therein extending from said inlet port in the end face thereof to said outlet in the side portion thereof, and said casing having a fourth passage extending from another of said plurality of openings in the end portion thereof and communicating with said third passage therein, and a relief valve disposed in said fourth passage in said casing.

5. A fluid pump comprising a casing having an end face, a block disposed on said end face, said block having a recess therein cooperating with said end face to define a pumping chamber, said end face having an inlet port and an outlet port therein over which said recess in said block extends, a rotor rotatably journalled in said block, a plurality of vanes disposed on said rotor and movable in said chamber for pumping fluid from said inlet port in said end face of said casing to said outlet port in said end face of said casing, a settling cup detachably secured over an end portion of said casing, said casing having an inlet and an outlet in side portions thereof, said end portion of said casing having a plurality of openings therein, said casing having a supply passage therein extending from said inlet in a side portion thereof to one of said plurality of openings in said end portion thereof, said casing having a second passage therein extending from another of said plurality of openings in the end portion thereof to said inlet port in said end face thereof, said casing having a third passage therein extending from said outlet port in the end face thereof to said outlet in the side portion thereof, and said casing having a fourth passage extending from another of said plurality of openings in the end portion thereof and communicating with said third passage therein, a relief valve disposed in said fourth passage, and a threaded fastener securing said relief valve to said casing and projecting into said block to secure said block to said end face.

6. A pump comprising a casing having a recess with a multi-ported end face, a pump block journaled in said recess and having an end face bottomed on said end face of the casing, said end face of the block having a recess therein overlapping the ports in the end face of the casing, and a vaned rotor in said recess of the block and coacting therewith to define a pumping chamber, said casing having inlet and outlet passages communicating with said ports.

THEODORE R. THOREN.

References Cited in the file of this patent
UNITED STATES PATENTS

| Number | Name | Date |
|---|---|---|
| 1,893,473 | Hueber et al. | Jan. 3, 1933 |
| 2,107,152 | Huber | Feb. 1, 1938 |
| 2,123,950 | Lattner | July 19, 1938 |
| 2,159,720 | Wahlmark | May 23, 1939 |
| 2,169,862 | Whitted | Aug. 15, 1939 |
| 2,246,610 | Wagner | June 24, 1941 |
| 2,370,249 | Korte et al. | Feb. 27, 1945 |
| 2,380,656 | Lauer et al. | July 31, 1945 |
| 2,457,643 | Caserta | Dec. 28, 1948 |
| 2,447,744 | Duemler | Aug. 24, 1948 |
| 2,460,047 | Von Wangenheim | Jan. 25, 1949 |